(12) United States Patent
Eilers et al.

(10) Patent No.: US 8,052,864 B2
(45) Date of Patent: *Nov. 8, 2011

(54) PROCESS TO PREPARE A SWEET CRUDE

(75) Inventors: Jacobus Eilers, Amsterdam (NL); Johannes Cornelis De Jong, Amsterdam (NL); Franciscus Johanna Arnoldus Martens, Amsterdam (NL)

(73) Assignee: Shell Oil Company, Houston, TX (US)

( * ) Notice: Subject to any disclaimer, the term of this patent is extended or adjusted under 35 U.S.C. 154(b) by 829 days.

This patent is subject to a terminal disclaimer.

(21) Appl. No.: 11/947,641

(22) Filed: Nov. 29, 2007

(65) Prior Publication Data

US 2008/0142408 A1 Jun. 19, 2008

Related U.S. Application Data

(60) Provisional application No. 60/868,678, filed on Dec. 5, 2006.

(30) Foreign Application Priority Data

Dec. 1, 2006 (EP) .................................. 06125232

(51) Int. Cl.
C10G 67/04 (2006.01)
C10G 1/02 (2006.01)
(52) U.S. Cl. .............. 208/86; 208/92; 208/94; 208/108; 208/390
(58) Field of Classification Search ............ 208/78, 208/80, 85, 86, 92, 94, 390, 108
See application file for complete search history.

(56) References Cited

U.S. PATENT DOCUMENTS 3,537,977 A 11/1970 Smith, Jr.
(Continued)

FOREIGN PATENT DOCUMENTS

DE 2342079 3/1975
(Continued)

OTHER PUBLICATIONS

Kalina, T and N.C. Nahas, "EXXON Catalytic Coal Gasification Process: Predevelopment Program, Final Project Report", Section 4, 1978, accessed from http://www.fischer-tropsch.org/DOE/DOE_reports/EXXONResEng/2369/fe-2369-24/fe-2369-24_toc.htm.*

(Continued)

Primary Examiner — Walter Griffin
Assistant Examiner — Renee E Robinson

(57) ABSTRACT

A process to prepare a sweet crude from an ash containing and heavy fraction of a tar sand oil comprising supplying an atmospheric distillation bottoms of a tar sands originated feed to a vacuum distillation to obtain a vacuum gas oil and a vacuum bottoms and contacting the vacuum gas oil with hydrogen to obtain a sweet synthetic crude. The vacuum bottoms obtained are separated into an asphalt fraction comprising between 0.1 and 4 wt % ash and a de-asphalted oil and the asphalt fraction is fed to a burner of a gasification reactor to obtain a mixture of hydrogen and carbon monoxide on which a water gas shift reaction is performed. Hydrogen sulphide and carbon dioxide are separated from the shifted gas in an acid removal unit thereby obtaining crude hydrogen which is purified and used to obtain the sweet synthetic crude. The asphalt fraction is provided to the burner in a liquid state and wherein in case the separation step fails to provide sufficient feed for the gasification reactor, vacuum bottoms from the first step are fed to the burner in a liquid state.

14 Claims, 3 Drawing Sheets

U.S. PATENT DOCUMENTS

| | | | |
|---|---|---|---|
| 4,165,274 A | 8/1979 | Kwant | 208/93 |
| 4,218,423 A | 8/1980 | Robin et al. | 422/207 |
| 4,343,626 A | 8/1982 | Peise et al. | 48/67 |
| 4,444,726 A | 4/1984 | Crotty, Jr. et al. | 422/207 |
| 4,466,808 A | 8/1984 | Koog | 48/197 R |
| 4,523,529 A | 6/1985 | Poll | 110/263 |
| 4,666,463 A * | 5/1987 | Stellaccio | 48/197 R |
| 4,705,542 A | 11/1987 | Gilmer | 55/93 |
| 4,778,483 A | 10/1988 | Martin et al. | 48/69 |
| 4,818,423 A | 4/1989 | Steinbach et al. | 252/49.6 |
| 4,828,578 A | 5/1989 | Den Bleyker | 58/69 |
| 4,852,997 A | 8/1989 | Segerstrom et al. | 48/210 |
| 4,880,438 A | 11/1989 | Den Bleyker | 48/69 |
| 5,069,755 A | 12/1991 | Durr et al. | 202/169 |
| 5,133,941 A | 7/1992 | Hays et al. | 422/140 |
| 5,958,365 A | 9/1999 | Liu | 423/655 |
| 5,968,212 A | 10/1999 | Peise et al. | 48/101 |
| 6,702,936 B2 | 3/2004 | Rettger et al. | 208/86 |
| 7,037,473 B1 | 5/2006 | Donner et al. | 422/242 |
| 2001/0020346 A1 | 9/2001 | Schingnitz et al. | 48/127.9 |
| 2007/0011945 A1 * | 1/2007 | Grootveld et al. | 48/197 R |

FOREIGN PATENT DOCUMENTS

| | | |
|---|---|---|
| DE | 2935754 | 6/1980 |
| DE | 3009850 | 9/1981 |
| DE | 19643258 | 4/1998 |
| DE | 19829385 | 10/1999 |
| DE | 19952754 | 5/2001 |
| DE | 19957696 | 5/2001 |
| DE | 200317461 | 8/2004 |
| EP | 24281 | 3/1981 |
| EP | 127878 | 8/1988 |
| EP | 291111 | 11/1988 |
| EP | 160424 | 8/1989 |
| EP | 129737 | 4/1990 |
| EP | 168128 | 3/1991 |
| EP | 545281 | 6/1993 |
| EP | 683218 | 11/1995 |
| EP | 759886 | 3/1997 |
| EP | 1373441 | 10/2002 |
| GB | 1413996 | 11/1972 |
| WO | WO9532148 | 11/1995 |
| WO | WO9603345 | 2/1996 |
| WO | WO9639354 | 12/1996 |
| WO | WO9722547 | 6/1997 |
| WO | WO9925648 | 5/1999 |

OTHER PUBLICATIONS

"Shell Gasification Process" Oil and Gas Journal, Sep. 6, 1971 pp. 85-90.

* cited by examiner ic # PROCESS TO PREPARE A SWEET CRUDE

This application claims the benefit of U.S. Provisional Application No. 60/868,678 filed Dec. 5, 2006 and European Application No. 06125232.6 filed Dec. 1, 2006, both of which are incorporated by reference.

BACKGROUND

The present invention is directed to a process to prepare a sweet crude from an ash containing and heavy fraction of a tar sand oil.

Such a process is described in U.S. Pat. No. 6,702,936.

In this process various distillate fractions of a tar sands feed are subjected to a hydroprocessing step to obtain a sweet synthetic crude. From a vacuum residue fraction of the tar sands feed an asphalt fraction is isolated and fed to a gasification unit to obtain a mixture of carbon monoxide and hydrogen. From this mixture substantially pure hydrogen is recovered and used in the hydroprocessing unit.

A disadvantage of this process is that it is sensitive for process failure. For example the hydroprocessing unit requires a very high availability of hydrogen. On the other hand it is known that gasification units and de-asphalting units do not have the high reliability to ensure a high hydrogen availability.

The present invention provides a solution to the above problem.

SUMMARY OF THE INVENTION

The present invention provides a process to prepare a sweet crude from an ash containing and heavy fraction of a tar sand oil by:
(a) supplying an atmospheric distillation bottoms of a tar sands originated feed to a vacuum distillation to obtain a vacuum gas oil and a vacuum bottoms,
(b) contacting the vacuum gas oil with hydrogen in the presence of a suitable hydrocracking catalyst to obtain a sweet synthetic crude
(c) separating the vacuum bottoms obtained in step (a) into an asphalt fraction comprising between 0.1 and 4 wt % ash and a de-asphalted oil,
(d) feeding said asphalt fraction to a burner of a gasification reactor where the asphalt fraction is partially oxidized in the presence of an oxidizer gas in a burner to obtain a mixture of hydrogen and carbon monoxide,
(e) performing a water gas shift reaction on the mixture of hydrogen and carbon monoxide,
(f) separating hydrogen sulphide and carbon dioxide from the shifted gas in an acid removal unit thereby obtaining crude hydrogen,
(g) purifying the crude hydrogen to obtain pure hydrogen and
(h) using part of the pure hydrogen in step (b), wherein in step (d) the asphalt fraction is provided to the burner in a liquid state and wherein in case separation step (c) fails to provide sufficient feed for step (d), step (d) is performed by feeding the vacuum bottoms of step (a) to the burner in a liquid state.

DETAILED DESCRIPTION

Figure 1:
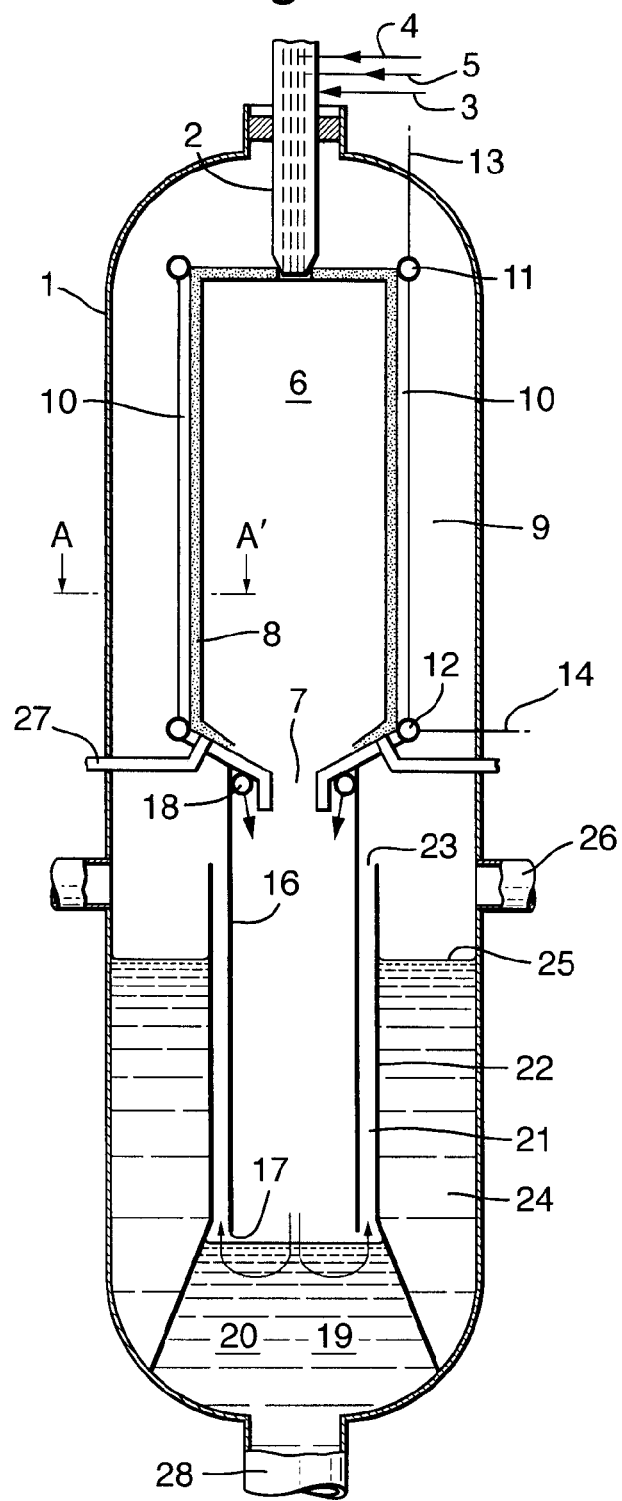
FIG. 1 is a cross-sectional view of a reactor vessel according to an embodiment of the invention.

Applicants found that by performing step (d) on a liquid asphalt feed it is possible to quickly change to a liquid vacuum bottoms feed in case the de-asphalting operation fails. If separation step (c) fails to provide sufficient feed for step (d) the hydrogen manufacture is not disturbed because step (d) can then be performed on the vacuum bottoms of step (a).

In order to further improve the reliability of the hydrogen production it is preferred to perform step (d) in n parallel-operated gasification reactors, wherein n is at least 2, preferably at least 3 and more preferably at least 4. In case one gasification reactor would fail, the hydrogen availability would then only be reduced by at least 33% or 25% in the latter cases. By designing some extra capacity for these gasification reactors one can also avoid any loss in hydrogen production by increasing the production in the remaining reactors in case one of the reactors fails.

The reliability may be further improved by positioning in parallel a spare gasification reactor in addition to the parallel-operated asphalt fed gasification reactors. In the event of a failure of one of the asphalt fed gasification reactors additional mixtures of hydrogen and carbon monoxide can be provided by partial oxidation of a methane comprising gas in the spare gasification reactor. The use of a methane fed gasification reactor is advantageous because these reactors are not very complicated and because they can advantageously make use of the oxidizer which is at that moment not used in one or more of the asphalt fed reactors. The methane feed is preferably natural gas, coal bed methane or the off-gas as separated from the effluent of hydroprocessing step (b). The gasification process for such methane comprising feeds are for example the "Shell Gasification Process" (SGP) as described in the Oil and Gas Journal, Sep. 6, 1971, pp 85-90. Other publications describing examples of such processes are EP-A-291111, WO-A-9722547, WO-A-9639354 and WO-A-9603345.

Steps (a), (b), (c), (f), (g) and (h) may be performed as described in for example U.S. Pat. No. 6,702,936, which publication is hereby incorporated by reference.

The burner in step (d) is preferably a multi-orifice burner provided with an arrangement of separate co-annular passages, wherein the hydrocarbon feed flows through a passage of the burner, an oxidizer gas flows through a separate passage of the burner and wherein the passage for hydrocarbon feed and the passage for oxidizer gas are separated by a passage through which a moderator gas flows and wherein the exit velocity of the moderator gas is greater than the exit velocity of the oxidizer gas.

Applicants found it advantageous to perform step (d) with said burner in said manner to avoid burner damage. A problem with the gasification of an asphalt fraction originating from a tar sands is that the feed will contain ash and that the feed will be very viscous. The highly viscous feed will require high feed temperatures in order to improve the ability to flow of the feed. In addition the feed may contain next to the ash also solid hydrocarbon agglomerates and lower boiling fractions. The high feed temperatures and/or the presence of lower boiling fractions or solids in the feed could give cause to a short burner life-time because of burner tip damage. By operating step (d) as above it has been found that burner damage can be avoided.

Without wishing to be bound to the following theory, applicants believe that the more stable and less damaging operation of the burner results by using a moderator gas having a high velocity as a separate medium between oxidizer gas and hydrocarbon feed. The moderator gas will break up the hydrocarbon feed and act as a moderator such that reactions in the recirculation zone at the burner tips are avoided. The result will be that the hydrocarbon droplets will only come in contact with the oxidizer gas at some distance from the burner surface. It is believed that this will result in less burner damage, e.g. burner tip retraction. The invention and its preferred embodiments will be further described below.

As explained above the relative velocity of the hydrocarbon feed and the moderator gas is relevant for performing the present invention. Preferably the exit velocity of the moderator gas is at least 5 times the velocity of the hydrocarbon feed in order to achieve a sufficient break up of the liquid feed. Preferably the exit velocity of the hydrocarbon feed is between 2 and 40 m/s and more preferably between 2 and 20 m/s. The exit velocity of the moderator gas is preferably between 40 and 200 m/s, more preferably between 40 and 150 m/s. The exit velocity of the oxidizer gas is preferably between 30 and 120 m/s, more preferably between 30 and 70 m/s. The respective velocities are measured or calculated at the outlet of the said respective channels into the gasification zone.

Oxidizer gas comprises air or (pure) oxygen or a mixture thereof. With pure oxygen is meant oxygen having a purity of between 95 and 100 vol %. The oxidizer gas preferably comprises of a mixture of said pure oxygen and moderator gas. The content of oxygen in such a moderator/oxygen mixture the oxidizer gas is preferably between 10 and 30 wt % at standard conditions. As moderator gas preferably steam, water or carbon dioxide or a combination thereof is used. More preferably steam is used as moderator gas.

The asphalt feed is liquid when fed to the burner and preferably has a kinematic viscosity at 232° C. of between 300 and 6000 cSt more preferably between 3500 and 5000 cSt, having a bulk density of between 650 and 1200 Kg/m$^3$. The ash content is between 0.1 and 4 wt %, especially between 1 and 4 wt %. The ash may comprise silicium, aluminium, iron, nickel, vanadium, titanium, potassium, magnesium and calcium. The feed may comprise halogen compounds, such as chloride. The sulphur content is between 1 and 10 wt %.

An example of a typical asphalt as obtained in step (c) is provided in Table 1.

TABLE 1

| Specific Density | Kg/m$^3$ | 1181 |
|---|---|---|
| Bulk Density | Kg/m$^3$ | 670 |
| Chloride | ppmw | 10 |
| Carbon | % w | 85.7 |
| Hydrogen | % w | 6.7 |
| Sulphur | % w | 4.4 |
| Nitrogen | % w | 1.6 |
| Ash | % w | 1.3 |
| Oxygen | % w | 0.2 |
| Ash | % w | 1.3 |
| Viscosity | | |
| @ 330° F. | cP | 26700 |
| @ 410° F. | cP | 1340 |
| @ 232° C. | cSt | 4660 |

The multi-orifice burner is provided with an arrangement of separate, preferably co-annular passages. Such burner arrangements are known and for example described in EP-A-545281 or DE-OS-2935754. Usually such burners comprise a number of slits at the burner outlet and hollow wall members with internal cooling fluid (e.g. water) passages. The passages may or may not be converging at the burner outlet. Instead of comprising internal cooling fluid passages, the burner may be provided with a suitable ceramic or refractory lining applied onto or suspended by a means closely adjacent to the outer surface of the burner (front) wall for resisting the heat load during operation or heat-up/shut down situations of the burner. Advantageously, the exit(s) of one or more passages may be retracted or protruded.

The burner preferably has 4, 5, 6 or 7 passages. In a preferred embodiment the burner has 6 or 7 passages. In an even more preferred embodiment the burner has 7 passages wherein a shielding gas flows through the outer most passage at a velocity of between 5 and 40 m/s. The shielding gas is preferably the same gas as used for the moderator gas. In the embodiment wherein the number of passages are 7, preferably the following streams flow through the below listed passages:

an oxidizer flows through the inner most passage 1 and passage 2, a moderator gas flows through passage 3, a hydrocarbon feed flows through passage 4, a moderator gas flows through passage 5, an oxidizer flows through passage 6, and a shielding gas flows through outer most passage 7, preferably at a velocity of between 5 and 40 m/s.

Alternatively the number of passages is 6 wherein passage 1 and 2 of the above burner are combined or wherein the passage 7 is omitted.

The process according to the present invention is preferably performed at a syngas product outlet temperature of between 1000 and 1800° C. and more preferably at a temperature between 1300 and 1800° C. The pressure of the mixture of carbon monoxide and hydrogen as prepared is preferably between 0.3 and 12 MPa and preferably between 3 and 8 MPa. The ash components as present in the feed will form a so-called liquid slag at these temperatures. The slag will preferably form a layer on the inner side of the reactor wall, thereby creating an isolation layer. The temperature conditions are so chosen that the slag will create a layer and flow to a lower positioned slag outlet device in the reactor. The slag outlet device is preferably a water bath at the bottom of the gasification reactor to which the slag will flow due to the forces of gravity.

The temperature of the syngas is preferably reduced by directly contacting the hot gas with liquid water in a so-called quenching step. Preferably the slag water bath and the water quench are combined. A water quench is advantageous because a water-saturated synthesis gas is obtained which can be readily used in the water shift step (e). Furthermore a water quench avoids complicated waste heat boilers, which would complicate the gasification reactor.

The direct contacting with liquid water is preferably preceded by injecting water into the flow of syngas steam. This water may be fresh water. In a preferred embodiment a solids containing water may partly or wholly replace the fresh water. Preferably the solids containing water is obtained in the water quenching zone as will be described below and/or from the scrubber unit as will be described below. For example the bleed stream of the scrubber unit is used. Use of a solids containing water as here described has the advantage that water treatment steps may be avoided or at least be limited.

In a preferred embodiment of the present invention the liquid water of the quenching step and the water bath for receiving the slag for is combined. Such combined slag removing means and water quench process steps are known from for example in U.S. Pat. Nos. 4,880,438, 4,778,483, 4,466,808, EP-A-129737, EP-A-127878, U.S. Pat. Nos. 4,218,423, 4,444,726, 4,828,578, EP-A-160424, U.S. Pat. No. 4,705,542, EP-A-168128.

The temperature of the synthesis gas after the water quench step is preferably between 130 and 330° C.

Figure 2:
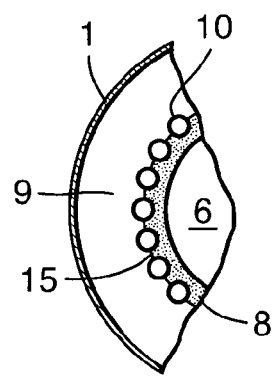
FIG. 2 is a cross-sectional view taken along the line A-A' of FIG. 1.

The process is preferably performed in a reactor vessel as illustrated in FIG. 1. The Figure shows a gasification reactor vessel (1), provided at its upper end with a downwardly directed multi-orifice burner (2). Burner (2) is provided with supply conduits for oxidizer gas (3), hydrocarbon feed (4) and moderator gas (5). The burner (2) is preferably arranged at the top end of the reactor vessel (1) pointing with its outlet in a downwardly direction. The vessel (1) preferably comprises a combustion chamber (6) in the upper half of the vessel provided with a product gas outlet (7) at its bottom end and an opening for the outlet of the burner (2) at its top end. Between the combustion chamber (6) and the wall of vessel (1) an annular space (9) is provided. The wall of the combustion chamber protects the outer wall of vessel (1) against the high temperatures of the combustion chamber (6). The combustion chamber (6) is preferably provided with a refractory lined wall (8) in order to reduce the heat transfer to the combustion chamber wall. The refractory wall (8) is preferably provided with means to cool said refractory wall. Preferably such cooling means are conduits (10) through which water flows. Such conduits may be arranged as a spirally wound design in said tubular formed refractory wall (8). Preferably the cooling conduits (10) are arranged as a configuration of parallel-arranged vertical conduits, which may optionally have a common header at their top (11) and a common distributor at their bottom (12) for discharging and supplying water respectively from the cooling means. The common header (11) is fluidly connected to a steam discharge conduit (13) and the common header (12) is fluidly connected to a water supply conduit (14). More preferably the cooling conduits (10) are interconnected such that they form a gas-tight combustion chamber (6) within the refractory wall as shown in FIG. 2. Such interconnected conduit type walls are also referred to as a membrane wall.

The cooling by said conduits (10) may be achieved by just the cooling capacity of the liquid water, wherein heated liquid water is obtained at the water discharge point. Preferably cooling is achieved by also evaporation of the water in the conduits (10). In such an embodiment the cooling conduits are vertically arranged as shown in FIG. 1 such that the steam as formed can easily flow to the common header (11) and to a steam outlet conduit (13) of the reactor vessel (1). Evaporation is preferred as a cooling method because the steam may find use in other applications in the process, such as process steam for shift reactions, heating medium for liquid feed or, after external superheating, as moderator gas in the burner according to the process according to the present invention. A more energy efficient process is so obtained.

The gasification vessel (1) preferably comprises a vertically aligned and tubular formed outlet part (16) fluidly connected to the lower end of the combustion chamber (6), which tubular formed outlet part (16) is open at its lower end, further referred to as the gas outlet (17) of the tubular outlet part (16). The outlet part (16) is provided at its upper end with means (18) to add a quenching medium to the, in use, downwardly flowing mixture of hydrogen and carbon monoxide. Preferably the vessel (1) is further provided at its lower end with a combined water quenching zone (19) and slag discharge water bath (20) as described above. The water quenching zone (19) is present in the pathway of the synthesis gas as it is deflected at outlet (17) in an upwardly direction (see arrows) to flow upward through, preferably an annular space (21) formed between an optional tubular shield (22) and outlet part (16). In annular space (21) the synthesis gas will intimately contact the water in a quenching operation mode. The upper end (23) of the annular space is in open communication with the space (24) between outlet part (16) and the wall of vessel (1). In space (24) a water level (25) will be present. Above said water level (25) one or more synthesis product outlet(s) (26) are located in the wall of vessel (1) to discharge the quenched synthesis gas. Between space (24) and annular space (9) a separation wall (27) may optionally be present.

At the lower end of vessel (1) a slag discharge opening (28) is suitably present. Through this discharge opening (28) slag together with part of the water is charged from the vessel by well known slag discharge means, such as sluice systems as for example described in U.S. Pat. Nos. 4,852,997 and 6,755,980.

Figure 3:
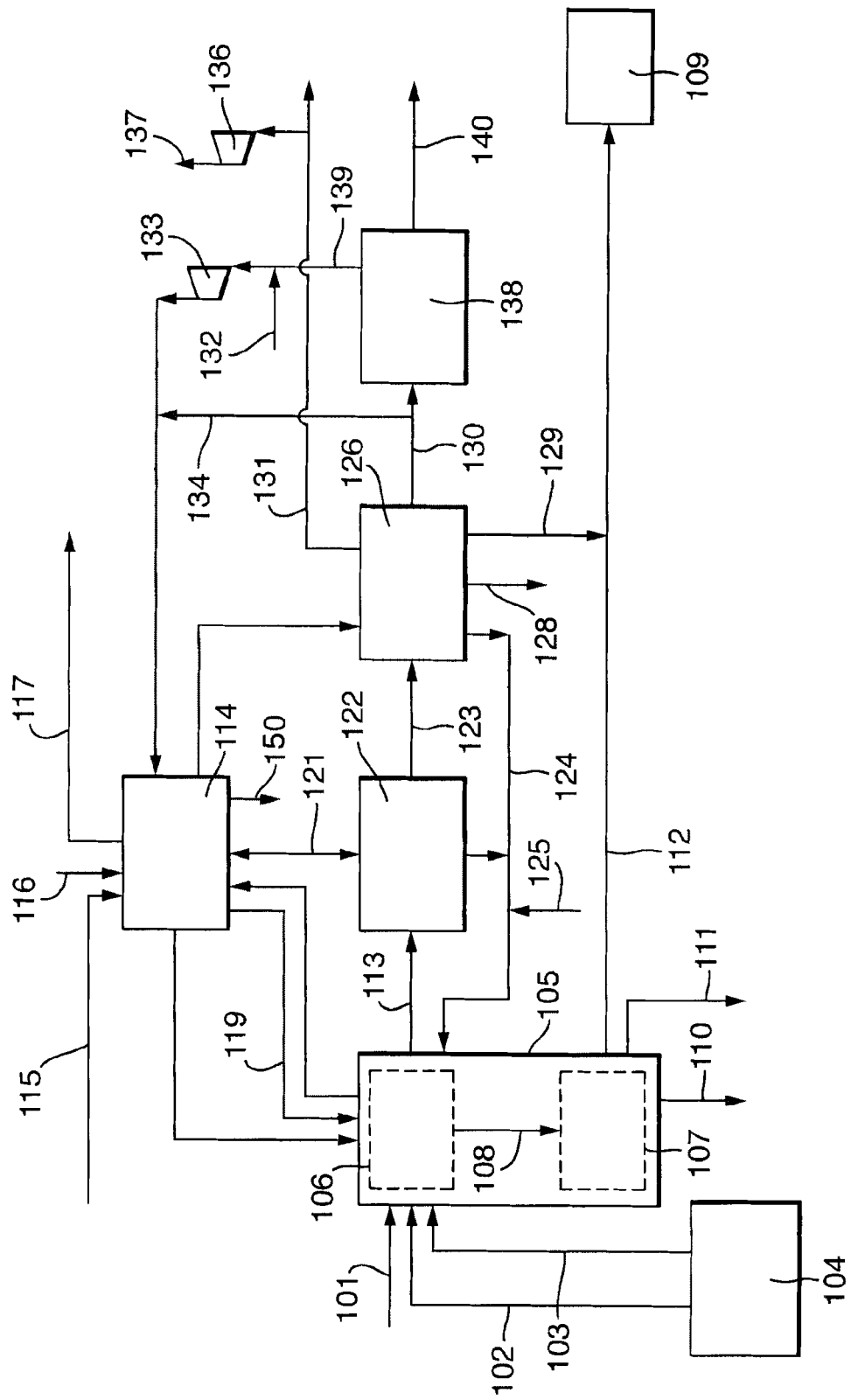
FIG. 3 is a flow diagram of a process according to the invention.

FIG. 3 illustrates how the process according to the present invention and the reactor of FIG. 1 can be applied in the production of pure hydrogen. In this scheme to a gasification reactor 105 an asphalt feed 101, oxygen 102 and super heated steam 119 from a gas turbine/steam turbine utilities block 114 are fed to a burner according to the process of the present invention as present in combustion chamber 106. Oxygen 102 is prepared in air separation unit 104. Nitrogen 103 as prepared in the same unit is used as purge gas in the gasification reactor 105. In gasification reactor 105 slag 108 flows to a water quench 107 to be disposed as slag via 110. The flash gas 112 separated from the slag 110 is send to Claus unit 109. A water bleed 111 is part of the process as illustrated.

The wet raw synthesis gas 113 as prepared is optionally treated in a scrubber unit to remove any solids and ash particles which have not been removed in the water quench before being further processed in a sour water gas shift step 122 yielding a shifted gas 123 and sour water, which is recycled via 124 to water quench 107. Between sour water gas shift step 122 and the gas turbine/steam turbine utilities block 114 heat integration 121 takes place. The shifted gas 123 is send to an acid gas removal step 126 yielding a carbon dioxide rich gas 131, crude hydrogen 130, $H_2S$ 129 and steam condensate 128. The carbon dioxide rich gas 131 is compressed in compressor 136 to yield compressed carbon dioxide gas 137. The carbon dioxide may be advantageously disposed of by $CO_2$ sequestration in for example sub-surface reservoirs. The crude hydrogen 130 is further processed in a pressure swing absorber (PSA) unit 138 to yield pure hydrogen 140. Part 134 of the crude hydrogen 130 may be used as feed in the gas turbine/steam turbine utilities block 114. The hydrogen rich PSA off-gas 139 is compressed in compressor 133 and used, optionally blended with nitrogen 132, as feed in the gas turbine/steam turbine utilities block 114. Gas turbine/steam turbine utilities block 114 is further provided with a fuel gas, natural gas, feed 115, a water feed 116 and a flue gas outlet 117 and an optional high pressure outlet 150.

Figure 4:
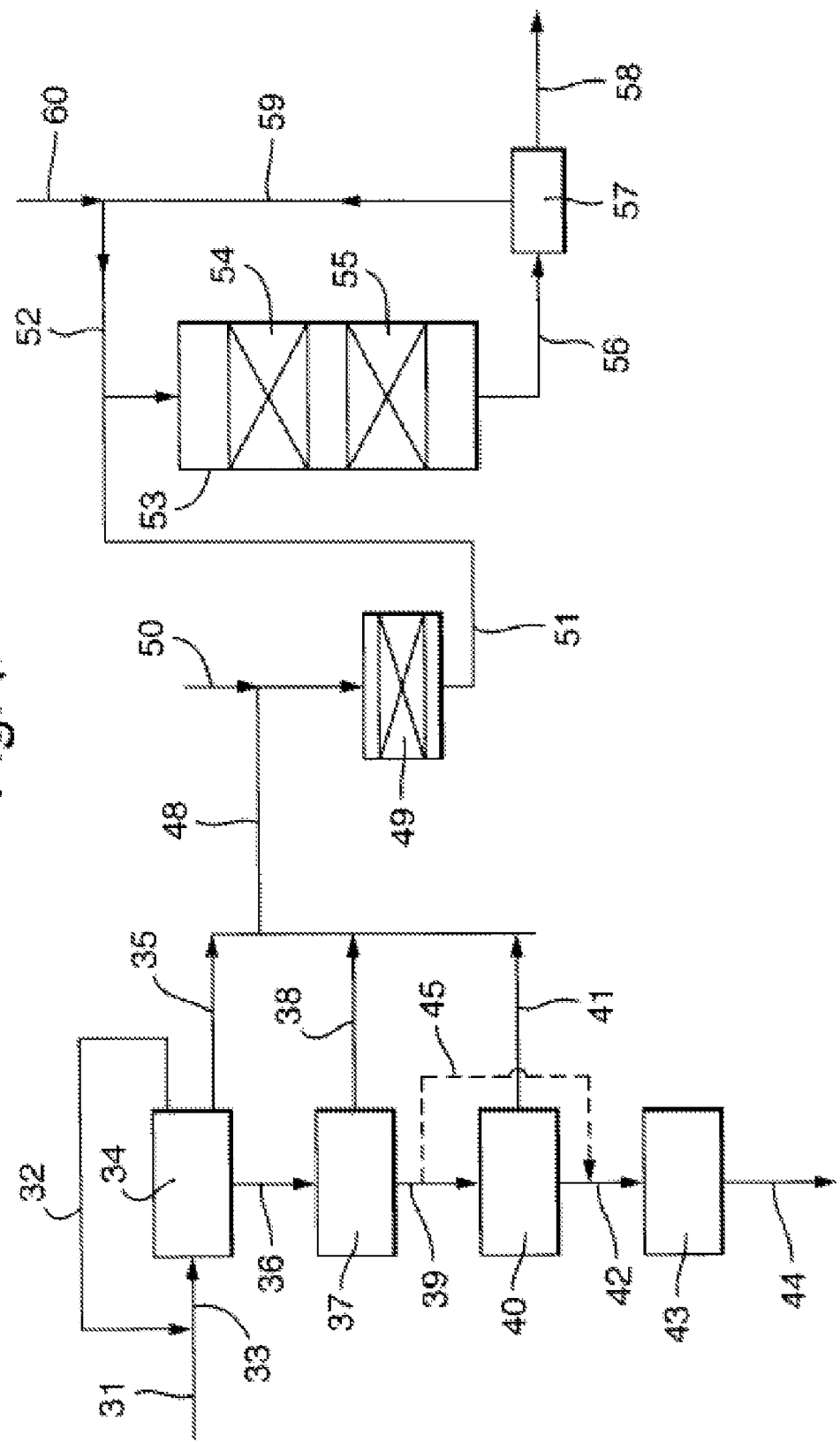
FIG. 4 is a flow diagram of a process according to an aspect of the invention.

In Table 2 an example is provided of the composition of the streams of FIG. 4 when a feed according to Table 1 is used. The numerals in Table 2 refer to FIG. 1.

The process according to the invention is further illustrated by means FIG. 4. Tar sand derived oil 31 is diluted with naphtha 32 to obtain diluted tar sand derived oil 33, which is supplied to atmospheric distillation unit 34. In atmospheric distillation unit 34, diluted tar sand derived oil 33 is distilled and two atmospheric distillate streams, i.e. naphtha stream 32 and atmospheric gasoil stream 35, and atmospheric residue 36 are obtained. Atmospheric residue 36 is vacuum distilled in vacuum distillation unit 37. Vacuum gasoil stream 38 is obtained as distillate stream and vacuum residue 39 as bottoms stream. Vacuum residue 39 is supplied to solvent deasphalting unit 40 to obtain deasphalted oil 41 and liquid asphaltic fraction 42. The liquid asphaltic fraction 42 is fed to a gasification unit 43. In case of a failure of solvent deasphalting unit 40 vacuum residue 45 is fed directly to gasification unit 43. In gasification unit 43 hydrogen 44 is prepared as illustrated in FIGS. 1 and 2. Distillate streams 35 and 38 are combined with deasphalted oil 41 to form combined hydrocracker feedstock 48. Combined feedstock 48 is hydrodemetallized in hydrodemetallization unit 49 in the presence of hydrogen 50. The hydrodemetallized combined feedstock 51 and additional hydrogen 52 are supplied to hydrocracking unit 53 comprising a first catalytic zone 54 comprising preferably a non-noble metal hydrotreating catalyst for hydrodesulphurization of the feedstock and a second catalytic zone 55 comprising preferably a non-noble metal hydrocracking catalyst. The effluent 56 of the second catalytic zone 55 is separated in gas/liquid separator 57 into upgraded sweet crude oil product 58 and a hydrogen-rich gas stream 59 that is combined with make-up hydrogen 60 to form hydrogen stream 52 that is supplied to the first catalytic zone 54. Make-up hydrogen 60 and/or hydrogen 50 are hydrogen 44 as produced in gasification unit 43. Upgraded sweet crude oil product 58 may be fractionated into several upgraded distillate fractions (not shown).

TABLE 2

| Component | | Wet raw syngas 113 | Gas ex shift section 123 | Sour gas 112 | $CO_2$ 137 | Raw Hydrogen 130 | Pure Hydrogen 140 | PSA offgas 139 |
|---|---|---|---|---|---|---|---|---|
| Methane | % mol | 0.05 | 0.07 | <0.01 | 0.05 | 0.11 | — | 0.74 |
| Argon | % mol | 0.02 | 0.03 | — | — | 0.04 | 0.04 | 0.06 |
| COS | % mol | 0.04 | — | — | — | — | — | — |
| $H_2S$ | % mol | 0.48 | 0.74 | 61 | 5 ppm | — | — | — |
| $H_2O$ | % mol | 56.18 | — | 5 | 0.05 | — | — | — |
| $H_2$ | % mol | 15.36 | 59.23 | <0.01 | 0.7 | 93.81 | 99.82 | 60.87 |
| $N_2$ | % mol | 0.53 | 0.76 | — | — | 1.20 | 0.14 | 7.04 |
| $CO_2$ | % mol | 0.54 | 38.01 | 34 | 99.1 | 3.01 | — | 19.53 |
| CO | % mol | 26.79 | 1.15 | <0.01 | 0.1 | 1.82 | — | 11.78 |
| HCN | % mol | 0.01 | — | — | — | — | — | — |
| $NH_3$ | % mol | 0.01 | 0.02 | 0.01 | — | — | — | — |

The invention claimed is:

1. A process to prepare a sweet crude from an ash containing and heavy fraction of a tar sand oil by:
   (a) supplying an atmospheric distillation bottoms of a tar sands originated feed to a vacuum distillation to obtain a vacuum gas oil and a vacuum bottoms,
   (b) contacting the vacuum gas oil with hydrogen in the presence of a suitable hydrocracking catalyst to obtain a sweet synthetic crude
   (c) separating the vacuum bottoms obtained in step (a) into an asphalt fraction comprising between 0.1 and 4 wt % ash and a de-asphalted oil,
   (d) feeding said asphalt fraction to a burner of a gasification reactor where the asphalt fraction is partially oxidized in the presence of an oxidizer gas in a burner to obtain a mixture of hydrogen and carbon monoxide,
   (e) performing a water gas shift reaction on the mixture of hydrogen and carbon monoxide,
   (f) separating hydrogen sulphide and carbon dioxide from the shifted gas in an acid removal unit thereby obtaining crude hydrogen,
   (g) purifying the crude hydrogen to obtain pure hydrogen and
   (h) using part of the pure hydrogen in step (b), wherein in step (d) the asphalt fraction is provided to the burner in a liquid state and wherein in case separation step (c) fails to provide sufficient feed for step (d), step (d) is performed by feeding the vacuum bottoms of step (a) to the burner in a liquid state.

2. A process according to claim 1, wherein step (d) is performed in n parallel-operated gasification reactors, wherein n is at least 2.

3. A process according to claim 2, wherein n is at least 3.

4. A process according to claim 2, wherein in addition to the parallel-operated gasification reactors a spare gasification reactor is positioned in parallel, which spare gasification reactor may, in the event of a failure of one of the other gasification reactors, provide additional mixture of hydrogen and carbon monoxide by partial oxidation of a methane comprising gas.

5. A process according to claim 1, wherein the burner in step (d) is a multi-orifice burner provided with an arrangement of separate co-annular passages, wherein the hydrocarbon feed flows through a passage of the burner, an oxidizer gas flows through a separate passage of the burner and wherein the passage for hydrocarbon feed and the passage for oxidizer gas are separated by a passage through which a moderator gas flows and wherein the exit velocity of the moderator gas is greater than the exit velocity of the oxidizer gas.

6. A process according to claim 5, wherein the exit velocity of the moderator gas is at least 5 times the exit velocity of the hydrocarbon feed.

7. A process according to claim 5, wherein the exit velocity of the moderator gas is between 40 and 150 m/s.

8. A process according to claim 1, wherein the mixture of hydrogen and carbon monoxide as obtained in the gasification reactor is cooled by contacting with liquid water as injected into the mixture of hydrogen and carbon monoxide.

9. A process according to claim 1, wherein the mixture of hydrogen and carbon monoxide is cooled in a water quenching zone by passing the gas through a water bath.

10. A process according to claim 1, wherein the burner is positioned in a vertical positioned vessel, the vessel comprising a combustion chamber in the upper half of the vessel, a product gas outlet, and wherein the burner protrudes through the vessel wall into the combustion chamber and wherein the combustion chamber is provided with a refractory lined wall, wherein the vessel also comprises a vertically aligned and tubular formed outlet part fluidly connected to the lower end of the combustion chamber, which tubular formed outlet part is open at its lower end, and is provided at its upper end with means to add a quenching medium to the, in use, downwardly flowing mixture of hydrogen and carbon monoxide, and wherein the vessel is further provided at its lower end with a water quenching zone as present in the pathway of the gas outlet of the tubular part and the product gas outlet and means to refresh the water of the water quenching zone.

11. A process according to claim 10, wherein the refractory lined wall comprises vertically aligned conduits through which, in use, evaporating water flows, and wherein the vessel is further provided with an inlet for water and an outlet for steam both fluidly connected to the vertically aligned conduits.

12. A process according to claim 10, wherein the refractory lined wall comprises one or more spirally wound conduits through which, in use, cooling water flows, and the vessel is further provided with an inlet for water and an outlet for heated water both fluidly connected to the spirally wound conduits.

13. A process to prepare a sweet crude from an ash containing and heavy fraction of a tar sand oil by:
   (a) supplying an atmospheric distillation bottoms of a tar sands originated feed to a vacuum distillation to obtain a vacuum gas oil and a vacuum bottoms,
   (b) contacting the vacuum gas oil with hydrogen in the presence of a suitable hydrocracking catalyst to obtain a sweet synthetic crude
   (c) separating the vacuum bottoms obtained in step (a) into an asphalt fraction comprising between 0.1 and 4 wt % ash and a de-asphalted oil,
   (d) feeding said asphalt fraction to a burner of a gasification reactor where the asphalt fraction is partially oxidized in the presence of an oxidizer gas in a burner to obtain a mixture of hydrogen and carbon monoxide, wherein the burner is a multi-orifice burner provided with an arrangement of separate co-annular passages, wherein the hydrocarbon feed flows through a passage of the burner, an oxidizer gas flows through a separate passage of the burner and wherein the passage for hydrocarbon feed and the passage for oxidizer gas are separated by a passage through which a moderator gas flows and wherein the exit velocity of the moderator gas is greater than the exit velocity of the oxidizer gas,
   (e) performing a water gas shift reaction on the mixture of hydrogen and carbon monoxide,
   (f) separating hydrogen sulphide and carbon dioxide from the shifted gas in an acid removal unit thereby obtaining crude hydrogen,
   (g) purifying the crude hydrogen to obtain pure hydrogen and
   (h) using part of the pure hydrogen in step (b), wherein in step (d) the asphalt fraction is provided to the burner in a liquid state and wherein in case separation step (c) fails to provide sufficient feed for step (d), step (d) is performed by feeding the vacuum bottoms of step (a) to the burner in a liquid state.

14. A process to prepare a sweet crude from an ash containing and heavy fraction of a tar sand oil by:
   (a) supplying an atmospheric distillation bottoms of a tar sands originated feed to a vacuum distillation to obtain a vacuum gas oil and a vacuum bottoms,
   (b) contacting the vacuum gas oil with hydrogen in the presence of a suitable hydrocracking catalyst to obtain a sweet synthetic crude
   (c) separating the vacuum bottoms obtained in step (a) into an asphalt fraction comprising between 0.1 and 4 wt % ash and a de-asphalted oil,
   (d) feeding said asphalt fraction to a burner of a gasification reactor where the asphalt fraction is partially oxidized in the presence of an oxidizer gas in a burner to obtain a mixture of hydrogen and carbon monoxide, wherein the burner is positioned in a vertical positioned vessel, the vessel comprising a combustion chamber in the upper half of the vessel, a product gas outlet, and wherein the burner protrudes through the vessel wall into the combustion chamber and wherein the combustion chamber is provided with a refractory lined wall, wherein the vessel also comprises a vertically aligned and tubular formed outlet part fluidly connected to the lower end of the combustion chamber, which tubular formed outlet part is open at its lower end, and is provided at its upper end with means to add a quenching medium to the, in use, downwardly flowing mixture of hydrogen and carbon monoxide, and wherein the vessel is further provided at its lower end with a water quenching zone as present in the pathway of the gas outlet of the tubular part and the product gas outlet and means to refresh the water of the water quenching zone,
   (e) performing a water gas shift reaction on the mixture of hydrogen and carbon monoxide,
   (f) separating hydrogen sulphide and carbon dioxide from the shifted gas in an acid removal unit thereby obtaining crude hydrogen,
   (g) purifying the crude hydrogen to obtain pure hydrogen and
   (h) using part of the pure hydrogen in step (b), wherein in step (d) the asphalt fraction is provided to the burner in a liquid state and wherein in case separation step (c) fails to provide sufficient feed for step (d), step (d) is performed by feeding the vacuum bottoms of step (a) to the burner in a liquid state.

* * * * *